Feb. 15, 1927.
A. A. SCHRAMM
1,617,549
STUFFING BOX
Filed Feb. 20, 1926
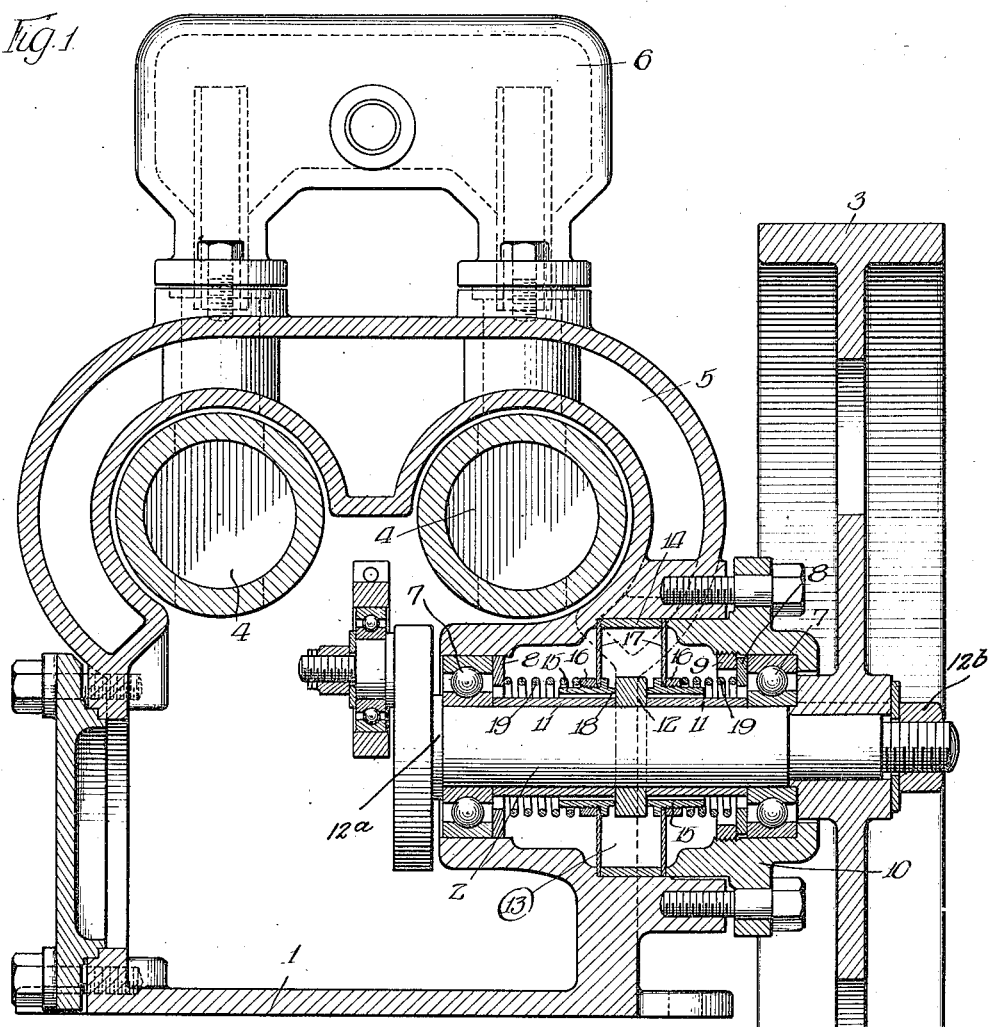
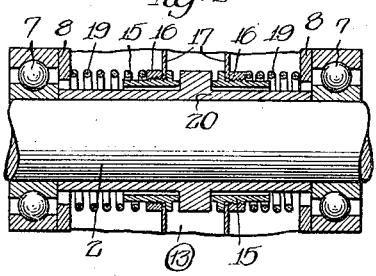
Witness:
R. Burkhardt
Inventor:
Albert A. Schramm,
By Wilkinson, Huxley, Byron & Knight
Attys.

Patented Feb. 15, 1927.

1,617,549

UNITED STATES PATENT OFFICE.

ALBERT A. SCHRAMM, OF CHICAGO, ILLINOIS.

STUFFING BOX.

Application filed February 20, 1926. Serial No. 89,568.

The present invention relates to stuffing boxes.

The present invention has very practical adaptability to refrigerating machinery and will be described in connection with such machinery, though it will be apparent as the description proceeds that the invention is of broader scope. Said invention constitutes an improvement over the structure disclosed in Patent No. 1,561,426, granted November 10, 1925, to Philip Fischbacher.

An object of the present invention is to provide a stuffing box structure which will have improved sealing qualities over what has been known and used heretofore.

A further object is to provide a stuffing box structure which provides less friction than has been involved heretofore and which provides for the proper lubrication between the bearing surfaces in said stuffing box.

A further object is to provide a stuffing box structure in which the area of bearing surfaces is reduced to a minimum, while the sealing qualities of said stuffing box structure are improved over prior practice.

Further objects will appear as the description proceeds.

Referring to the drawings—

Figure 1 is a sectional view of a compressor such as is used in refrigerating plants, said section being taken along a plane which includes the axis of the driving shaft, thereof; and Figure 2 represents a slight modification of the stuffing box structure shown in Figure 1.

The numeral 1 indicates a housing which provides bearings for the shaft 2, which may be driven from an outside source, as for example a pulley 3. Said shaft is connected through connecting rods, the showing of which has been omitted for reasons of clarity, to the reciprocating plungers 4—4, which plungers reciprocate in cylinders having the cooling jacket 5. The numeral 6 indicates a chamber for refrigerating medium, which chamber is connected to the cylinders within which the plungers 4—4 operate. The space within the housing 1, provided the reciprocating plungers are used for compressing action, is under pressure, and it is necessary to provide a gas or air-tight stuffing box, whereby leakage along the shaft 2 will be prevented. Said shaft 2 is rotatably mounted upon the roller bearings 7—7, which roller bearings are provided at their inner sides with the rings 8—8. A screw-threaded ring 9, having threaded engagement with a fixed adjacent member, holds the outer roller bearing assembly securely in position within the cap portion 10, which may be securely bolted to the housing 1. The left-hand roller bearing assembly 7 may abut against a shoulder upon the shaft 2, being held against said shoulder by sleeve means which will be referred to hereinafter.

Mounted for rotation with the shaft 2 are the sleeve members 11—11, which have their adjacent ends mounted in abutting relationship with the collar 12, which is also rotatable with the shaft 2. Said shaft 2, sleeves 11—11, collar 12 and the inner races of the ball bearing assemblies 7—7 rotate as a unit, the left-hand roller bearing assembly 7 abutting against the shoulder 12$^a$ at the left-hand end of the shaft 2, being held in close engagement with said shoulder 12$^a$ by means of the nut 12$^b$ at the opposite end of the shaft 2. Encircling the shaft 2 with its sleeves 11—11 and collar 12 is the casing 13, which casing includes the outer sleeve 14 and the two inner sleeves 15—15. Said inner sleeves 15—15 have screw-threaded portions for receiving the nuts 16—16 which nuts secure the diaphragms 17—17 upon said sleeves 15—15. The casing 13 is securely mounted within the housing 1, being gripped between a shoulder on said housing 1 and said cap portion 10, and, being non-rotatable relative to said housing 1, may be tightly fitted, whereby the escape of lubricant around the outside of said casing may be effectually prevented. The inner sleeves 15—15 have their adjacent edge portions 18 rounded, whereby to have a relatively narrow region of contact with the sides of the collar 12. Springs 19—19 react against the rings 8—8 to urge the rounded edge portions of the inner sleeves 15—15 into bearing relationship with said collar 12.

According to the modification shown in Figure 2, the sleeves 11—11 and collar 12 are formed into a single member, indicated by the numeral 20, which single member has all of the functions of the three members 11—11 and 12 shown in Figure 1.

The casing 13 will ordinarily be filled with a heavy grease whereas the space outside of said casing 13 will provide a reservoir for lubricating material of lighter weight. The level of said lighter lubricating material will ordinarily be at least as high as the lowermost portion of the shaft 2.

When the refrigerating apparatus disclosed is operating with a compressive action, pressure higher than atmospheric pressure will be set up within the housing 1, which pressure will tend to force refrigerant out along the shaft 2. Pressure from within the housing 1 would accordingly tend to move the left-hand diaphragm 17 toward the right as the parts are viewed in the drawing, which action will force the rounded extremity 18 of the left-hand sleeve 15 into close engagement with the collar 12. This action will supplement the action of the left-hand spring 19. The additive actions of the pressure within the housing 1 and the pressure of the left-hand spring 19 will result in an effective seal between the rounded edge portion of the left-hand sleeve 15 and the collar 12.

The present invention has the advantage therefore, that with a minimum of bearing surface an improved sealing is effected.

When the device is used as a suction pump, whereby the pressure within the housing 1 will be reduced below atmospheric pressure, the right-hand diaphragm will be moved to the left, resulting in the pressure of the right-hand sleeve 15 against the right-hand face of the collar 12 as the parts are viewed in Figure 1. The present invention is applicable, therefore, both to pressure pumps and suction pumps without change in the stuffing box structure.

The illustrated embodiments of the present invention have been chosen merely for the purpose of explaining the invention and should not be considered in a limiting sense. Many modifications will occur to those skilled in the art. It is intended to cover all such modifications that fall within the scope of the appended claims.

I claim:

1. In stuffing box structure, in combination, a relatively stationary member, a rotatable shaft, bearings for supporting said shaft from said stationary member, an annular collar rotatable with said shaft, a pair of diaphragms having air-tight connection with said stationary member, sleeves encircling said shaft having air-tight connection with said diaphragms near the center portions of said diaphragms, said sleeves having rounded edge portions adapted to engage with the two sides of said collar and spring means for urging said sleeves into engagement with said collar.

2. In a refrigerating pump, a housing adapted to have a pressure set up therein either higher than atmospheric pressure or to have the pressure therein reduced below atmospheric pressure, a rotatable shaft extending from the inside of said housing to the atmosphere, bearings for supporting said shaft, an annular collar rotatable with said shaft, a pair of diaphragms having air-tight connection with said housing, sleeves encircling said shaft having air-tight connection with said diaphragms near the center portions of said diaphragms, said sleeves having rounded edge portions adapted to engage with the two sides of said collar, and coil springs enclosing said shaft for urging said sleeves into engagement with said collar, whereby one of said springs has an additive action within said housing when said pressure is above atmospheric pressure and whereby the other of said springs has an additive action cooperating with atmospheric pressure when the pressure within said housing is below atmospheric pressure.

Signed at Chicago, Illinois, this 12th day of February, 1926.

ALBERT A. SCHRAMM.